US011070741B2

(12) United States Patent
Chen et al.

(10) Patent No.: US 11,070,741 B2
(45) Date of Patent: Jul. 20, 2021

(54) HIGH DYNAMIC RANGE VIDEO SHOOTING METHOD AND DEVICE

(71) Applicant: SHENZHEN KANDAO TECHNOLOGY CO. LTD, Guangdong (CN)

(72) Inventors: Dan Chen, Guangdong (CN); Zhijing Shao, Guangdong (CN)

(73) Assignee: SHENZHEN KANDAO TECHNOLOGY CO. LTD, Guangdong (CN)

( * ) Notice: Subject to any disclaimer, the term of this patent is extended or adjusted under 35 U.S.C. 154(b) by 0 days.

(21) Appl. No.: 16/758,405

(22) PCT Filed: Jul. 11, 2018

(86) PCT No.: PCT/CN2018/095274
§ 371 (c)(1),
(2) Date: Jul. 13, 2020

(87) PCT Pub. No.: WO2019/080543
PCT Pub. Date: May 2, 2019

(65) Prior Publication Data
US 2020/0344399 A1    Oct. 29, 2020

(30) Foreign Application Priority Data
Oct. 23, 2017    (CN) .......................... 201710994861.X

(51) Int. Cl.
*H04N 5/235*    (2006.01)
(52) U.S. Cl.
CPC ................................ *H04N 5/2355* (2013.01)

(58) Field of Classification Search
CPC ....... H04N 5/2355; H04N 9/77; H04N 5/2351
(Continued)

(56) References Cited

U.S. PATENT DOCUMENTS 9,282,256 B1 *    3/2016    Shan .................. H04N 5/23254
9,955,084 B1 *    4/2018    Haynold ................. G06T 5/007
(Continued)

FOREIGN PATENT DOCUMENTS

CN    1805551    7/2006
CN    101963751    2/2011
(Continued)

OTHER PUBLICATIONS

Quan Wei, et al., "Constructing Panoramic High Dynamic Range Image Based on Different Amounts of Exposures," Journal of System Simulation, vol. 27, Oct. 2015, pp. 1-8.

*Primary Examiner* — Thai Q Tran
*Assistant Examiner* — Stephen R Smith
(74) *Attorney, Agent, or Firm* — JCIP Global Inc.

(57) ABSTRACT

The present invention provides a high dynamic range video shooting method, comprising: acquiring corresponding images by means of shooting lenses of a multi-lens panoramic camera; determining corresponding image synthesis weights of image pixel blocks according to pixel color gray scale variations, pixel color gray scale differences and pixel color gray scale offsets of the image pixel blocks of each shot image; forming a high dynamic range panoramic shot image based on the image synthesis weights of the image pixel blocks of each shot image; and splicing all the high dynamic range panoramic shot images.

12 Claims, 6 Drawing Sheets

(58) Field of Classification Search
USPC ........ 348/38, 229.1, 234, 360; 382/169, 284
See application file for complete search history.

(56) References Cited

U.S. PATENT DOCUMENTS

| | | | | |
|---|---|---|---|---|
| 2004/0100565 | A1* | 5/2004 | Chen | G06T 3/4038 |
| | | | | 348/229.1 |
| 2010/0150473 | A1 | 6/2010 | Kwon et al. | |
| 2013/0028509 | A1* | 1/2013 | Moon | G06T 5/009 |
| | | | | 382/162 |
| 2015/0181103 | A1* | 6/2015 | Kimura | H04N 5/2355 |
| | | | | 348/360 |
| 2015/0304538 | A1* | 10/2015 | Huang | G06T 5/50 |
| | | | | 348/234 |
| 2016/0093029 | A1* | 3/2016 | Micovic | H04N 5/232 |
| | | | | 348/229.1 |
| 2017/0213330 | A1* | 7/2017 | Pudipeddi | G06T 5/50 |
| 2018/0302544 | A1* | 10/2018 | Dhiman | G06T 7/246 |
| 2020/0126197 | A1* | 4/2020 | Kikuchi | G06T 5/40 |

FOREIGN PATENT DOCUMENTS

| | | | |
|---|---|---|---|
| CN | 102420944 | | 4/2012 |
| CN | 102905058 | | 1/2013 |
| CN | 105469375 | | 4/2016 |
| CN | 106162024 | | 11/2016 |
| CN | 106162024 A | * | 11/2016 |
| CN | 107800979 | | 3/2018 |

\* cited by examiner

HIGH DYNAMIC RANGE VIDEO SHOOTING METHOD AND DEVICE

CROSS-REFERENCE TO RELATED APPLICATION

This application is a 371 of international application of PCT application serial no. PCT/CN2018/095274, filed on Jul. 11, 2018, which claims the priority benefit of China application no. 201710994861.X, filed on Oct. 23, 2017. The entirety of each of the above mentioned patent applications is hereby incorporated by reference herein and made a part of this specification.

BACKGROUND OF THE INVENTION

Technical Field

The invention relates to the technical field of image processing, in particular to a high dynamic range video shooting method and device.

Description of Related Art

HDR images refer to high dynamic range images and can make full use of the high photosensitive range of human eyes so that highly refined images can be displayed. The natural light captured by human eyes has a very high brightness range which is generally expressed with an integer of 10-12 bits. However, the photosensitive range of a camera light sensor is usually quite small, which is generally expressed with an integer of 8 bits.

As a result, a satisfactory HDR image can only be synthesized from multiple camera images captured at the same location with different brightness ranges (i.e., some camera images capture lower brightness and some camera images capture higher brightness).

To capture a plurality of camera images with different brightness ranges, multiple images with different exposure settings need to be shot continuously within a short period of time, some of which are underexposed so as to better capture highlight details, and some are overexposed to better capture shadow details. To achieve the above-mentioned continuous shooting, a camera needs to remain stationary, and fast moving objects should not exist in a scene, in such a way, the accuracy of the synthesized HDR image can be ensured.

However, in practice, flying birds, running people and other fast moving objects often appear in the scene during video shooting, which leads to the technical problem that the positions of objects in an HDR video synthesized later are inaccurate.

Therefore, it is necessary to provide a high dynamic range video shooting method and device to solve the problems of the prior art.

SUMMARY OF THE INVENTION

The embodiments of the invention provide a high dynamic range video shooting method and device which can shoot an HDR video of fast moving objects, so as to solve the technical problem that positions of high-speed moving objects in an HDR video synthesized by an existing high dynamic range video shooting method and device are inaccurate.

The embodiments of the invention provide a high dynamic range video shooting method, which is used for shooting high dynamic range videos by a multi-lens panoramic camera, wherein the multi-lens panoramic camera is provided with a plurality of shooting lenses with different shooting directions, and images shot by adjacent shooting lenses have overlapping areas. The high dynamic range video shooting method comprises:

acquiring corresponding shot images by the shooting lenses of the multi-lens panoramic camera, wherein the exposure intensities of images shot by adjacent shooting lenses are different;

determining corresponding image synthesis weights of image pixel blocks according to pixel color gray scale variations, pixel color gray scale differences and pixel color gray scale offsets of the image pixel blocks of each shot image;

synthesizing all the shot images based on the image synthesis weights of the image pixel blocks of each shot image to form a high dynamic range panoramic shot image;

conducting brightness continuity processing on the high dynamic range panoramic shot image to obtain a processed high dynamic range panoramic shot image; and splicing all the processed high dynamic range panoramic shot images to form a high dynamic range panoramic video;

wherein the step of determining corresponding image synthesis weights of image pixel blocks according to pixel color gray scale variations, pixel color gray scale differences and pixel color gray scale offsets of the image pixel blocks of each shot image comprises:

$$w = a*L1 + b*L2 - c*L3;$$

wherein w is the image synthesis weight of the image pixel block, L1 is the pixel color gray scale variation of the image pixel block, L2 is the pixel color gray scale difference of the image pixel block, L3 is the image color gray scale offset, a is a pixel color gray scale variation weight coefficient, b is a pixel color gray scale difference weight coefficient, and c is an image color gray scale offset weight coefficient;

wherein the step of conducting brightness continuity processing on the high dynamic range panoramic shot image comprises:

$$v_k(T) = \sum_{n}^{N} w_k^n v_k(I_n);$$

$$O = \mathrm{argmin}_{O,\{w_k^n\}} \sum_{n}^{N} \square v_k(O) - v_k(T) \square_F^2 + \sum_{n}^{N} \Delta \square (v_k(O) - v_k(I_n)) \square_F^2;$$

wherein N is the number of the shooting lenses, I represents the image pixel blocks in the shot image, T represents the image pixel blocks in the high dynamic range panoramic shot image, O represents the image pixel blocks in the high dynamic range panoramic shot image after brightness continuity processing, $w_k^n$ is an image synthesis weight of a k<th> image pixel block of an n<th> shooting lens, $v_k(I_n)$ is a pixel color gray scale value of the k<th> image pixel block of the n<th> shooting lens, $v_k(T)$ is a pixel color gray scale value of a k<th> image pixel block of the high dynamic range panoramic shot image, and $v_k(O)$ is a pixel color gray scale value of a k<th> image pixel block of the high dynamic range panoramic shot image after brightness continuity processing.

The embodiments of the invention provide a high dynamic range video shooting method, which is used for shooting high dynamic range videos by a multi-lens panoramic camera, wherein the multi-lens panoramic camera is provided with a plurality of shooting lenses with different shooting directions, and images shot by adjacent shooting lenses have overlapping areas. The high dynamic range video shooting method comprises:

acquiring corresponding shot images by the shooting lenses of the multi-lens panoramic camera, wherein the exposure intensities of images shot by adjacent shooting lenses are different;

determining corresponding image synthesis weights of image pixel blocks according to pixel color gray scale variations, pixel color gray scale differences and pixel color gray scale offsets of the image pixel blocks of each shot image;

synthesizing all the shot images based on the image synthesis weights of the image pixel blocks of each shot image to form a high dynamic range panoramic shot image; and splicing all the high dynamic range panoramic shot images to form a high dynamic range panoramic video.

In the high dynamic range video shooting method of the present invention, the exposure intensities includes high exposure intensity and low exposure intensity, when one shooting lens is of high exposure intensity, the adjacent shooting lenses are of low exposure intensity, and when one shooting lens is of low exposure intensity, the adjacent shooting lenses are of high exposure intensity.

In the high dynamic range video shooting method of the present invention, the step of determining corresponding image synthesis weights of image pixel blocks according to pixel color gray scale variations, pixel color gray scale differences and pixel color gray scale offsets of the image pixel blocks of each shot image comprises:

$$w = a*L1 + b*L2 - c*L3;$$

wherein w is the image synthesis weight of the image pixel block, L1 is the pixel color gray scale variation of the image pixel block, L2 is the pixel color gray scale difference of the image pixel block, L3 is the image color gray scale offset, a is a pixel color gray scale variation weight coefficient, b is a pixel color gray scale difference weight coefficient, and c is an image color gray scale offset weight coefficient.

After the step of forming a high dynamic range panoramic shot image, the high dynamic range video shooting method of the present invention further comprises:

conducting brightness continuity processing on the high dynamic range panoramic shot image to obtain a processed high dynamic range panoramic shot image.

The step of splicing all the high dynamic range panoramic shot images to form a high dynamic range panoramic video comprises:

splicing all the processed high dynamic range panoramic shot images to form a high dynamic range panoramic video.

In the high dynamic range video shooting method of the present invention, the step of conducting brightness continuity processing on the high dynamic range panoramic shot image comprises:

$$v_k(T) = \sum_n^N w_k^n v_k(I_n);$$

$$O = \operatorname{argmin}_{O,\{w_k^n\}} \sum_n^N \Box v_k(O) - v_k(T) \Box_F^2 + \sum_n^N \Delta \Box (v_k(O) - v_k(I_n)) \Box_F^2;$$

wherein N is the number of the shooting lenses, I represents the image pixel blocks in the shot image, T represents the image pixel blocks in the high dynamic range panoramic shot image, O represents the image pixel blocks in the high dynamic range panoramic shot image after brightness continuity processing, $w_k^n$ is an image synthesis weight of a k<th> image pixel block of an n<th> shooting lens, $v_k(I_n)$ is a pixel color gray scale value of the k<th> image pixel block of the n<th> shooting lens, $v_k(T)$ is a pixel color gray scale value of a k<th> image pixel block of the high dynamic range panoramic shot image, and $v_k(O)$ is a pixel color gray scale value of a k<th> image pixel block of the high dynamic range panoramic shot image after brightness continuity processing.

In the high dynamic range video shooting method of the present invention, the step of determining corresponding image synthesis weights of image pixel blocks according to pixel color gray scale variations, pixel color gray scale differences and pixel color gray scale offsets of the image pixel blocks of each shot image further comprises:

normalizing the image synthesis weights.

The embodiments of the invention further provide a high dynamic range video shooting device, which is arranged in a multi-lens panoramic camera and used for shooting high dynamic range videos by the multi-lens panoramic camera, wherein the multi-lens panoramic camera is provided with a plurality of shooting lenses with different shooting directions, and images shot by adjacent shooting lenses have overlapping areas. The high dynamic range video shooting device comprises:

a shot image acquiring module, for acquiring corresponding shot images by the shooting lenses of the multi-lens panoramic camera, wherein the exposure intensities of images shit by adjacent shooting lenses are different;

an image synthesis weight determining module, for determining corresponding image synthesis weights of image pixel blocks according to pixel color gray scale variations, pixel color gray scale differences and pixel color gray scale offsets of the image pixel blocks of each shot image;

an image synthesizing module, for synthesizing all the shot images based on the image synthesis weights of the image pixel blocks of each shot image to form a high dynamic range panoramic shot image; and an image splicing module, for splicing all the high dynamic range panoramic shot images to form a high dynamic range panoramic video.

In the high dynamic range video shooting device of the present invention, the image synthesis weight determining module obtains the image synthesis weight according to the following formula:

$$w = a*L1 + b*L2 - c*L3;$$

wherein w is the image synthesis weight of the image pixel block, L1 is the pixel color gray scale variation of the image pixel block, L2 is the pixel color gray scale difference of the image pixel block, L3 is the image color gray scale offset, a is a pixel color gray scale variation weight coefficient, b is a pixel color gray scale difference weight coefficient, and c is an image color gray scale offset weight coefficient.

In the high dynamic range video shooting device of the present invention, the high dynamic range video shooting device further comprises:

a brightness continuity processing module, for conducting brightness continuity processing on the high dynamic range panoramic shot image to obtain a processed high dynamic range panoramic shot image.

The image splicing module is used for splicing all the processed high dynamic range panoramic shot images to form a high dynamic range panoramic video.

In the high dynamic range video shooting device of the present invention, the brightness continuity processing module performs brightness continuity processing on the high dynamic range panoramic shot image according to the following formula:

$$v_k(T) = \sum_n^N w_k^n v_k(I_n);$$

$$O = \mathrm{argmin}_{O, \{w_k^n\}} \sum_n^N \Box v_k(O) - v_k(T) \Box_F^2 + \sum_n^N \Delta \Box (v_k(O) - v_k(I_n)) \Box_F^2;$$

wherein N is the number of the shooting lenses, I represents the image pixel blocks in the shot image, T represents the image pixel blocks in the high dynamic range panoramic shot image, O represents the image pixel blocks in the high dynamic range panoramic shot image after brightness continuity processing, $w_k^n$ is an image synthesis weight of a k<th> image pixel block of an n<th> shooting lens, and $v_k(I_n)$ is a pixel color gray scale value of the k<th> image pixel block of the n<th> shooting lens; and $v_k(T)$ is a pixel color gray scale value of a k<th> image pixel block of the high dynamic range panoramic shot image, and $v_k(O)$ is a pixel color gray scale value of a k<th> image pixel block of the high dynamic range panoramic shot image after brightness continuity processing.

Compared with a high dynamic range video shooting method and device in the prior art, the high dynamic range video shooting method and device of the present invention have the advantages that different exposure intensities are adopted for the images shot by adjacent shooting lenses of the multi-lens panoramic camera, so that a high dynamic range panoramic shot image can be synthesized from multiple images with different exposure intensities, and further a high dynamic range panoramic video is formed. Since each frame of the video at least corresponds to one high dynamic range panoramic shot image, HDR videos of fast moving objects can be shot. The present invention solves the technical problem that positions of high-speed moving objects in an HDR video synthesized by an existing high dynamic range video shooting method and device are inaccurate.

BRIEF DESCRIPTION OF THE DRAWINGS

The present invention will be described in further detail below with reference to the drawings and embodiments.

DETAILED DESCRIPTION OF THE EMBODIMENTS

Hereinafter, the technical solution in the embodiments of the present invention will be described clearly and completely in conjunction with the drawings in the embodiments of the present invention. Obviously, the described embodiments are only part of the embodiments of the present invention, not all of the embodiments. Based on the embodiments of the present invention, all other embodiments obtained by those skilled in the art without creative labor are within the scope of the present invention.

A high dynamic range video shooting method and device are disclosed by the invention. The high dynamic range video shooting device can be arranged in a multi-lens panoramic camera, so that the multi-lens panoramic camera can be used for shooting high dynamic range videos. The multi-lens panoramic camera is provided with a plurality of shooting lenses with different shooting directions, and images shot by adjacent shooting lenses have overlapping areas. The exposure intensities of images shot by adjacent shooting lenses are different, so that a plurality of images shot at the same location with different exposure intensities can be synthesized into a high dynamic range panoramic shot image, and further a high dynamic range panoramic video is formed. Since each frame of the high dynamic range panoramic video corresponds to one high dynamic range panoramic shot image, HDR videos of fast moving objects can be shot by means of the high dynamic range video shooting method and device of the invention. The present invention solves the technical problem that positions of high-speed moving objects in an HDR video synthesized by an existing high dynamic range video shooting method and device are inaccurate.

Figure 1:
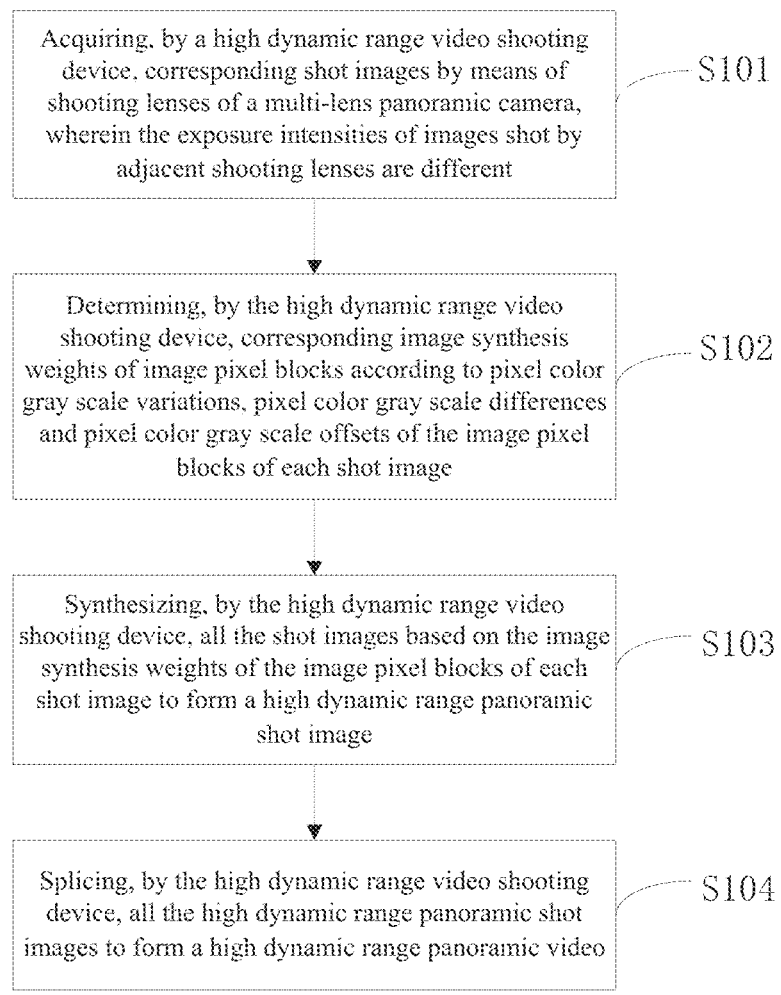
FIG. 1 is a flowchart of a first embodiment of a high dynamic range video shooting method of the present invention.

Please refer to FIG. 1, which is a flowchart of a first embodiment of a high dynamic range video shooting method of the present invention. The high dynamic range video shooting method of the present embodiment can be implemented using the multi-lens panoramic camera described above so that the multi-lens panoramic camera can be used for shooting high dynamic range videos. The multi-lens panoramic camera is provided with a plurality of shooting lenses with different shooting directions, such as six shooting lenses, each shooting lens can shoot an image area of 180 degrees, and if the six shooting lenses are uniformly distributed in a circle, each image pixel block in the finally obtained high dynamic range panoramic shot image corresponds to three shooting lenses.

The high dynamic range video shooting method of the present embodiment comprises:

S101, acquiring, by a high dynamic range video shooting device, corresponding shot images by means of the shooting lenses of the multi-lens panoramic camera, wherein the exposure intensities of images shot by adjacent shooting lenses are different;

S102, determining, by the high dynamic range video shooting device, corresponding image synthesis weights of image pixel blocks according to pixel color gray scale variations, pixel color gray scale differences and pixel color gray scale offsets of the image pixel blocks of each shot image;

S103, synthesizing, by the high dynamic range video shooting device, all the shot images based on the image synthesis weights of the image pixel blocks of each shot image to form a high dynamic range panoramic shot image; and S104, splicing, by the high dynamic range video shooting device, all the high dynamic range panoramic shot images to form a high dynamic range panoramic video.

The specific flow of each step of the high dynamic range video shooting method of the present embodiment will be described in detail below.

In S101, the high dynamic range video shooting device uses the shooting lenses of the multi-lens panoramic camera to acquire the corresponding shot images, i.e., each shooting lens acquires an image of its corresponding shooting range. Since images shot by adjacent shooting lenses have overlapping areas, and the exposure intensities of images shot by adjacent shooting lenses are different, each area of the finally synthesized panoramic shot image can be synthesized by the shot images with different exposure intensities, thus obtaining a panoramic shot image with a high dynamic range.

The exposure intensities herein includes high exposure intensity and low exposure intensity. The high exposure intensity herein refers to the operation that the image shot by the corresponding shooting lens is exposed for a long period of time, and the low exposure intensity means that the image shot by the corresponding shooting lens is exposed for a short period of time. The specific exposure time can be set according to the requirements of users. The exposure time corresponding to high exposure intensity must be longer than the exposure time corresponding to low exposure intensity. High exposure intensity and low exposure intensity are distributed in an alternating mode for all the shooting lenses of the multi-lens panoramic camera, that is, when one shooting lens is of high exposure intensity, the adjacent shooting lenses are of low exposure intensity, and when one shooting lens is of low exposure intensity, the adjacent shooting lenses are of high exposure intensity.

If the user has low requirements on the precision of high dynamic range video shooting, the exposure intensity of each shooting lens can be kept constant during the shooting process of the multi-lens panoramic camera. As each shooting area corresponds to shooting lens with both high exposure intensity and low exposure intensity, fine processing of shot images can be realized.

If the user has high requirements on the precision of high dynamic range video shooting, the exposure intensity of the shooting lenses can be switched during the shooting process of the multi-lens panoramic camera. For example, after an interval of set frames, high exposure intensity of the shooting lens with high exposure intensity is switched to low exposure intensity, and low exposure intensity of the shooting lens with low exposure intensity is switched to high exposure intensity.

As each shooting lens has higher shooting precision for a specific area (such as a directly facing shooting area), like the same shooting lens can shot an image with high exposure intensity and an image with low exposure intensity for a specific area, the shooting precision of static highlight details (low exposure intensity) and static shadow details (high exposure intensity) of the specific area can be further improved on the basis of ensuring accurate acquisition of fast moving objects.

In S102, the high dynamic range video shooting device acquires the pixel color gray scale variations, the pixel color gray scale differences and the pixel color gray scale offsets of the image pixel blocks of each shot image.

The image pixel blocks herein are one or more pixel units constituting the shot image. The pixel color gray scale variation of the image pixel block refers to the color gray scale variation between the current image pixel block and neighboring image pixel blocks, and is used to indicate the display difference between the image pixel block and the neighboring image pixel blocks in the shot image. If the green gray scale of the current image pixel block is 50 and the green gray scale of the neighboring image pixel blocks is 51, the green gray scale variation of the image pixel block is 1. Of course, the pixel color gray scale variation of the image pixel block herein should involve the variation between all color gray scales of the current image pixel block and the color gray scales corresponding to all the neighboring image pixel blocks. The greater this variation is, the greater the pixel color gray scale variation of the corresponding image pixel block is.

The pixel color gray scale difference of an image pixel refers to the difference between the red gray scale, the blue gray scale and the green gray scale in the current image pixel block, and is used for indicating the display difference of the image pixel block on a certain color. For example, if the green gray scale of the current image pixel block is 255, the blue gray scale is 50, and the red gray scale is 50, it can indicate that the image pixel block tends to display green; and if the current image pixel block has a green gray scale of 100, a blue gray scale of 100, and a red gray scale of 100, it is indicated that the image pixel block tends to display white. The larger the display difference of the image pixel block on a certain color is, the larger the pixel color gray scale difference of the image pixel block is.

The pixel color gray scale offset of the image pixel refers to the difference between the color gray scales including the red gray scale, the blue gray scale and the green gray scale and the center gray scale in the current image pixel block, and is used to indicate the display brightness of the image pixel block. If the color gray scales are much higher than the central gray scale, the display brightness of the corresponding image pixel block is higher; and if the color gray scales are much lower than the central gray scale, the display brightness of the corresponding image pixel block is lower. The greater the difference between the color gray scales and the center gray scale is, the greater the pixel color gray scale offset of the image pixel block is.

Then, the high dynamic range video shooting device determines corresponding image synthesis weights of image pixel blocks according to the pixel color gray scale variations, the pixel color gray scale differences and the pixel color gray scale offsets of the image pixel blocks of each shot image. The image synthesis weights herein are the synthesis weight ratios of the image pixel blocks of each shot image when the image pixel blocks are synthesized into the high dynamic range panoramic shot image. Specifically, the image synthesis weight of each image pixel block can be calculated by the following formula:

$$w=a*L1+b*L2-c*L3;$$

wherein w is the image synthesis weight of the image pixel block, L1 is the pixel color gray scale variation of the image pixel block, L2 is the pixel color gray scale difference of the image pixel block, L3 is the image color gray scale offset, a is a pixel color gray scale variation weight coefficient, b is a pixel color gray scale difference weight coefficient, and c is an image color gray scale offset weight coefficient.

That is, the larger the pixel color gray scale variation is, the larger the image synthesis weight of the image pixel block is; the larger the pixel color gray scale difference is, the greater the image synthesis weight of the image pixel block is; and the smaller the image color gray scale offset is, the greater the image synthesis weight of the image pixel block is.

In S103, the high dynamic range video shooting device synthesizes all the shot images based on the image synthesis weights of the image pixel blocks of each shot image obtained in S102 to form the high dynamic range panoramic shot image.

Since each image pixel block of each shot image has an image synthesis weight, and each image pixel block in the synthesized high dynamic range panoramic shot image is composed of at least one image pixel block of the shot images, the pixel color gray scale value of each image pixel block in the high dynamic range panoramic shot image can be formed by superposing a plurality of image pixel blocks. Specifically, the pixel color gray scale value of each image pixel block of the high dynamic range panoramic shot image can be calculated by the following formula:

$$v_k(T) = \sum_{n}^{N} w_k^n v_k(I_n);$$

wherein N is the number of the shooting lenses, I represents the image pixel blocks in the shot image, T represents the image pixel blocks in the high dynamic range panoramic shot image, $v_k(I_n)$ is the pixel color gray scale value of the k<th> image pixel block of the n<th> shooting lens, and $v_k(T)$ is the pixel color gray scale value of the k<th> image pixel block of the high dynamic range panoramic shot image.

In S104, the high dynamic range video shooting device splices all the obtained high dynamic range panoramic shot images in chronological order to finally form the high dynamic range panoramic video.

Preferably, if the multi-lens panoramic camera is set in S101 to switch the shooting intensity of the shooting lenses in the shooting process, it is necessary to carry out brightness continuity processing on the frames before and after the switching to reduce the brightness jump of adjacent frames.

Then the high dynamic video shooting process of the high dynamic video shooting method of the present embodiment is completed.

In the high dynamic range video shooting method of the present embodiment, different exposure intensities are adopted for the images shot by adjacent shooting lenses of the multi-lens panoramic camera, so that the high dynamic range panoramic shot images can be synthesized from multiple shot images with different exposure intensities, and further the high dynamic range panoramic video is formed. Since each frame of the video corresponds to at least one high dynamic range panoramic shot image, HDR videos of fast moving objects can be shot.

Figure 2:
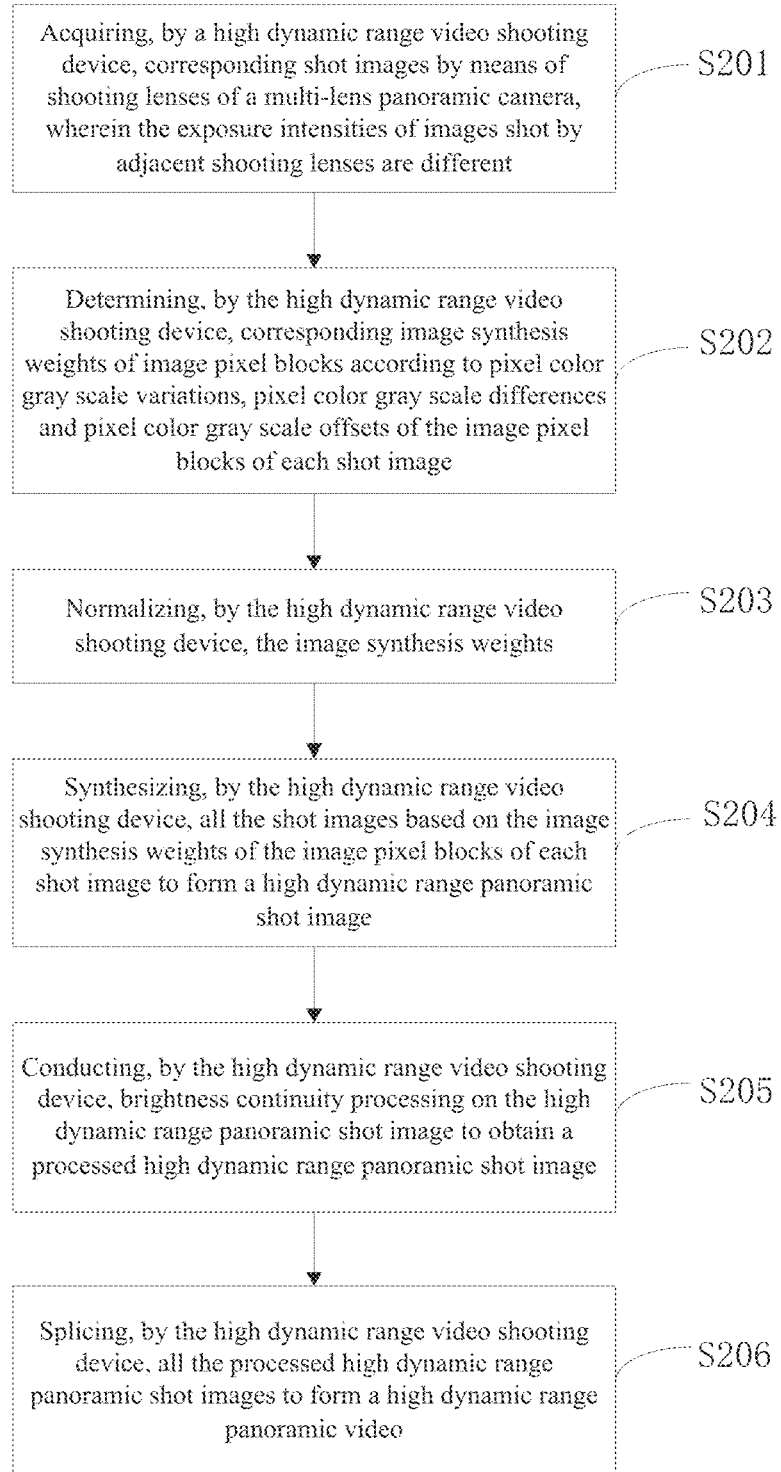
FIG. 2 is a flowchart of a second embodiment of a high dynamic range video shooting method of the present invention.

Please refer to FIG. 2, which is a flowchart of a second embodiment of a high dynamic range video shooting method of the present invention. The high dynamic range video shooting method of the present embodiment can be implemented using the multi-lens panoramic camera described above so that the multi-lens panoramic camera can be used for shooting high dynamic range videos. The high dynamic range video shooting method of the present embodiment comprises:

S201, acquiring, by a high dynamic range video shooting device, corresponding shot images by means of the shooting lenses of the multi-lens panoramic camera, wherein the exposure intensities of images shot by adjacent shooting lenses are different;

S202, determining, by the high dynamic range video shooting device, corresponding image synthesis weights of image pixel blocks according to pixel color gray scale variations, pixel color gray scale differences and pixel color gray scale offsets of the image pixel blocks of each shot image;

S203, normalizing, by the high dynamic range video shooting device, the image synthesis weights;

S204, synthesizing, by the high dynamic range video shooting device, all the shot images based on the image synthesis weights of the image pixel blocks of each shot image to form a high dynamic range panoramic shot image;

S205, conducting, by the high dynamic range video shooting device, brightness continuity processing on the high dynamic range panoramic shot image to obtain a processed high dynamic range panoramic shot image, and S206, splicing, by the high dynamic range video shooting device, all the processed high dynamic range panoramic shot images to form a high dynamic range panoramic video.

The specific flow of each step of the high dynamic range video shooting method of the present embodiment will be described in detail below.

In S201, the high dynamic range video shooting device uses the shooting lenses of the multi-lens panoramic camera to acquire the corresponding shot images, i.e., each shooting lens acquires an image of its corresponding shooting range. Since images shot by adjacent shooting lenses have overlapping areas, and the exposure intensities of images shot by adjacent shooting lenses are different, each area of the finally synthesized panoramic shot image can be synthesized by the shot images with different exposure intensities, thus obtaining a panoramic shot image with a high dynamic range.

In S202, the high dynamic range video shooting device acquires the pixel color gray scale variations, the pixel color gray scale differences and the pixel color gray scale offsets of the image pixel blocks of each shot image.

Then, the high dynamic range video shooting device determines corresponding image synthesis weights of the image pixel blocks according to the pixel color gray scale variations, the pixel color gray scale differences and the pixel color gray scale offsets of the image pixel blocks of each shot image. The image synthesis weights herein are the synthesis weight ratios of the image pixel blocks of each shot image when the image pixel blocks are synthesized into the high dynamic range panoramic shot image. Specifically, the image synthesis weight of each image pixel block can be calculated by the following formula:

$$w=a*L1+b*L2-c*L3;$$

wherein w is the image synthesis weight of the image pixel block, L1 is the pixel color gray scale variation of the image pixel block, L2 is the pixel color gray scale difference of the image pixel block, L3 is the image color gray scale offset, a is a pixel color gray scale variation weight coefficient, b is a pixel color gray scale difference weight coefficient, and c is an image color gray scale offset weight coefficient.

That is, the larger the pixel color gray scale variation is, the larger the image synthesis weight of the image pixel block is; the larger the pixel color gray scale difference is, the greater the image synthesis weight of the image pixel block is; and the smaller the image color gray scale offset is, the greater the image synthesis weight of the image pixel block is.

In S203, the high dynamic range video shooting device normalizes the image synthesis weights acquired in S202 to facilitate the subsequent synthesis of the high dynamic range panoramic shot image.

In S204, the high dynamic range video shooting device synthesizes all the shot images based on the image synthesis weights of the image pixel blocks of each shot image obtained in S203 to form the high dynamic range panoramic shot image.

Since each image pixel block of each shot image has an image synthesis weight, and each image pixel block in the synthesized high dynamic range panoramic shot image is composed of at least one image pixel block of the shot images, the pixel color gray scale value of each image pixel block in the high dynamic range panoramic shot image can be formed by superposing a plurality of image pixel blocks. Specifically, the pixel color gray scale value of each image pixel block of the high dynamic range panoramic shot image can be calculated by the following formula:

$$v_k(T) = \sum_{n}^{N} w_k^n v_k(I_n);$$

wherein N is the number of the shooting lenses, I represents the image pixel blocks in the shot image, T represents the image pixel blocks in the high dynamic range panoramic shot image, $v_k(I_n)$ is the pixel color gray scale value of the k<th> image pixel block of the n<th> shooting lens, and $v_k(T)$ is the pixel color gray scale value of the k<th> image pixel block of the high dynamic range panoramic shot image.

In S205, since each image pixel block of the high dynamic range panoramic shot image is synthesized by the image pixel blocks in different shot images, brightness jump of adjacent image pixel blocks may occur in the generated high dynamic range panoramic shot image. Therefore, the high dynamic range video shooting device needs to perform brightness continuity processing on the high dynamic range panoramic shot image acquired in S204 to obtain the processed high dynamic range panoramic shot image. Specifically, brightness continuity processing can be carried out on the high dynamic range panoramic shot image by the following formula:

$$O = \mathrm{argmin}_{O,\{w_k^n\}} \sum_{n}^{N} \Box v_k(O) - v_k(T) \Box_F^2 + \sum_{n}^{N} \Delta \Box (v_k(O) - v_k(I_n)) \Box_F^2;$$

wherein N is the number of the shooting lenses, I represents the image pixel blocks in the shot image, T represents the image pixel blocks in the high dynamic range panoramic shot image, O represents the image pixel blocks in the high dynamic range panoramic shot image after brightness continuity processing, $w_k^n$ is an image synthesis weight of a k<th> image pixel block of an n<th> shooting lens, $v_k(I_n)$ is a pixel color gray scale value of the k<th> image pixel block of the n<th> shooting lens, $v_k(T)$ is a pixel color gray scale value of a k<th> image pixel block of the high dynamic range panoramic shot image, and $v_k(O)$ is a pixel color gray scale value of a k<th> image pixel block of the high dynamic range panoramic shot image after brightness continuity processing.

The brightness difference of the finally output high dynamic range panoramic shot image after brightness continuity processing is continuous in the overlapping areas of various shot images, thus avoiding the problem of brightness jump of adjacent image pixel blocks.

In S206, the high dynamic range video shooting device splices all the obtained high dynamic range panoramic shot images after brightness continuity processing in chronological order to finally form the high dynamic range panoramic video.

Then the high dynamic video shooting process of the high dynamic video shooting method of the present embodiment is completed.

On the basis of the first embodiment, the high dynamic range video shooting method of the present embodiment further performs brightness continuity processing on the high dynamic range panoramic shot image, thereby further improving the stability of the obtained high dynamic range panoramic shot image and further improving the display effect of the corresponding high dynamic range panoramic video.

Figure 3:
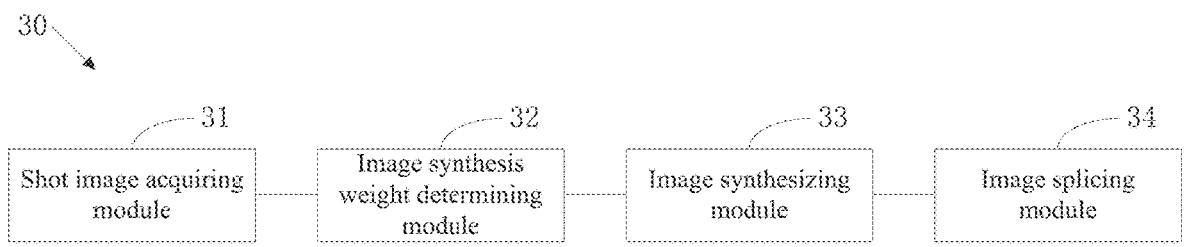
FIG. 3 is a structural schematic diagram of a first embodiment of a high dynamic range video shooting device of the present invention.

The present invention also provides a high dynamic range video shooting device. Please refer to FIG. 3 which is a structural schematic diagram of a first embodiment of the high dynamic range video shooting device of the present invention. The high dynamic range video shooting device of the present embodiment can be implemented using the first embodiment of the high dynamic range video shooting method described above. The high dynamic range video shooting device is arranged in a multi-lens panoramic camera to allow the multi-lens panoramic camera to conduct high dynamic range video shooting. The multi-lens panoramic camera is provided with a plurality of shooting lenses with different shooting directions, and images shot by adjacent shooting lenses have overlapping areas.

The high dynamic range video shooting device 30 of the present embodiment comprises a shot image acquiring module 31, an image synthesis weight determining module 32, an image synthesizing module 33, and an image splicing module 34. The shot image acquiring module 31 is used for acquiring corresponding shot images by means of the shooting lenses of the multi-lens panoramic camera, wherein the exposure intensities of images shot by adjacent shooting lenses are different; the image synthesis weight determining module 32 is used for determining corresponding image synthesis weights of image pixel blocks according to pixel color gray scale variations, pixel color gray scale differences and pixel color gray scale offsets of the image pixel blocks of each shot image; the image synthesizing module 33 is used for synthesizing all the shot images based on the image synthesis weights of the image pixel blocks of each shot image to form a high dynamic range panoramic shot image; and the image splicing module 34 is used for splicing all the high dynamic range panoramic shot images to form a high dynamic range panoramic video.

When the high dynamic range video shooting device 30 of the present embodiment is used, first, the image acquiring module 31 acquires the corresponding shot images by means of the shooting lenses of the multi-lens panoramic camera, i.e., each shooting lens acquires an image of its corresponding shooting range. Since images shot by adjacent shooting lenses have overlapping areas, and the exposure intensities of images shot by adjacent shooting lenses are different, each area of the finally synthesized panoramic shot image can be synthesized by the shot images with different exposure intensities, thus obtaining a panoramic shot image with a high dynamic range.

The exposure intensities herein include high exposure intensity and low exposure intensity. The high exposure intensity herein refers to the operation that the image shot by the corresponding shooting lens is exposed for a long period of time, and the low exposure intensity means that the image shot by the corresponding shooting lens is exposed for a short period of time. The specific exposure time can be set according to the requirements of users. The exposure time corresponding to high exposure intensity must be longer than the exposure time corresponding to low exposure intensity. High exposure intensity and low exposure intensity are distributed in an alternating mode for all the shooting lenses of the multi-lens panoramic camera, that is, when one shooting lens is of high exposure intensity, the adjacent shooting lenses are of low exposure intensity, and when one shooting lens is of low exposure intensity, the adjacent shooting lenses are of high exposure intensity.

Herein, the exposure intensity of the shooting lenses can be kept constant during the shooting process of the multi-lens panoramic camera, and the exposure intensity of the shooting lenses can also be adjusted according to user requirements, as long as high exposure intensity and low exposure intensity are distributed in an alternating mode for all the shooting lenses of the multi-lens panoramic camera. The exposure intensity state of the shooting lenses at a specific moment is not specifically limited.

Then, the image synthesis weight determining module 32 acquires the pixel color gray scale variations, the pixel color gray scale differences, and the pixel color gray scale offsets of the image pixel blocks of each shot image.

The image pixel blocks herein are one or more pixel units constituting the shot image. The pixel color gray scale variation of the image pixel block refers to the color gray scale variation between the current image pixel block and neighboring image pixel blocks, and is used to indicate the display difference between the image pixel block and the neighboring image pixel blocks in the image. If the green gray scale of the current image pixel block is 50 and the green gray scale of the neighboring image pixel blocks is 51, the green gray scale variation of the image pixel block is 1. Of course, the pixel color gray scale variation of the image pixel block herein should involve the variation between all color gray scales of the current image pixel block and the color gray scales corresponding to all the neighboring image pixel blocks. The greater this variation is, the greater the pixel color gray scale variation of the corresponding image pixel block is.

The pixel color gray scale difference of an image pixel refers to the difference between the red gray scale, the blue gray scale and the green gray scale in the current image pixel block, and is used for indicating the display difference of the image pixel block on a certain color. For example, if the green gray scale of the current image pixel block is 255, the blue gray scale is 50, and the red gray scale is 50, it can be indicated that the image pixel block tends to display green; and if the current image pixel block has a green gray scale of 100, a blue gray scale of 100, and a red gray scale of 100, it is indicated that the image pixel block tends to display white. The larger the display difference of the image pixel block on a certain color is, the larger the pixel color gray scale difference of the image pixel block is.

The pixel color gray scale offset of the image pixel refers to the difference between the color gray scales including the red gray scale, the blue gray scale and the green gray scale and the center gray scale in the current image pixel block, and is used to indicate the display brightness of the image pixel block. If the color gray scales are much higher than the central gray scale, the display brightness of the corresponding image pixel block is higher; and if the color gray scales are much lower than the central gray scale, the display brightness of the corresponding image pixel block is lower. The greater the difference between the color gray scales and the center gray scale is, the greater the pixel color gray scale offset of the image pixel block is.

Then, the image synthesis weight determining module 32 determines corresponding image synthesis weights of image pixel blocks according to the pixel color gray scale variations, the pixel color gray scale differences and the pixel color gray scale offsets of the image pixel blocks of each shot image. The image synthesis weights herein are the synthesis weight ratios of the image pixel blocks of the shot image when the image pixel blocks are synthesized into the high dynamic range panoramic shot image. Specifically, the image synthesis weight of each image pixel block can be calculated by the following formula:

$$w = a*L1 + b*L2 - c*L3;$$

wherein w is the image synthesis weight of the image pixel block, L1 is the pixel color gray scale variation of the image pixel block, L2 is the pixel color gray scale difference of the image pixel block, L3 is the image color gray scale offset, a is a pixel color gray scale variation weight coefficient, b is a pixel color gray scale difference weight coefficient, and c is an image color gray scale offset weight coefficient.

That is, the larger the pixel color gray scale variation is, the larger the image synthesis weight of the image pixel block is; the larger the pixel color gray scale difference is, the greater the image synthesis weight of the image pixel block is; and the smaller the image color gray scale offset is, the greater the image synthesis weight of the image pixel block is.

Then, the image synthesizing module 33 synthesizes all the shot images based on the image synthesis weights of the image pixel blocks of each shot image obtained by the image synthesis weight determining module 32 to form the high dynamic range panoramic shot image.

Since each image pixel block of each shot image has an image synthesis weight, and each image pixel block in the synthesized high dynamic range panoramic shot image is composed of at least one image pixel block of the shot images, the pixel color gray scale value of each image pixel block in the high dynamic range panoramic shot image can be formed by superposing a plurality of image pixel blocks. Specifically, the pixel color gray scale value of each image pixel block of the high dynamic range panoramic shot image can be calculated by the following formula:

$$v_k(T) = \sum_n^N w_k^n v_k(I_n);$$

wherein N is the number of the shooting lenses, I represents the image pixel blocks in the shot image, T represents the image pixel blocks in the high dynamic range panoramic shot image, $v_k(I_n)$ is the pixel color gray scale value of the k<th> image pixel block of the n<th> shooting lens, and $v_k(T)$ is the pixel color gray scale value of the k<th> image pixel block of the high dynamic range panoramic shot image.

Finally, the image splicing module 34 splices all the acquired high dynamic range panoramic shot images in chronological order to finally form the high dynamic range panoramic video.

Then the high dynamic video shooting process of the high dynamic range video shooting device 30 of the present embodiment is completed.

In the high dynamic range video shooting device of the present embodiment, different exposure intensities are adopted for the images shot by adjacent shooting lenses of the multi-lens panoramic camera, so that a high dynamic range panoramic shot image can be synthesized from multiple shot images with different exposure intensities, and further the high dynamic range panoramic video is formed. Since each frame of the video corresponds to at least one high dynamic range panoramic shot image, HDR videos of fast moving objects can be shot.

Figure 4:
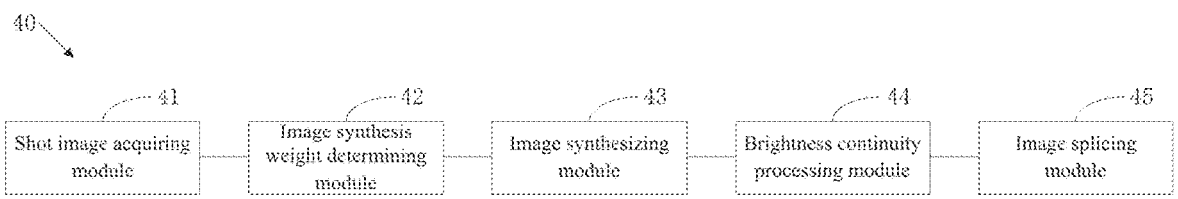
FIG. 4 is a structural schematic diagram of a second embodiment of a high dynamic range video shooting device of the present invention.

Please refer to FIG. 4 which is a structural schematic diagram of a second embodiment of the high dynamic range video shooting device of the present invention. The high dynamic range video shooting device of the present embodiment can be implemented using the second embodiment of the high dynamic range video shooting method described above. The high dynamic range video shooting device 40 of the present embodiment comprises a shot image acquiring module 41, an image synthesis weight determining module 42, an image synthesizing module 43, a brightness continuity processing module 44, and an image splicing module 45.

The image acquiring module 41 is used for acquiring corresponding shot images by means of the shooting lenses of the multi-lens panoramic camera, wherein the exposure intensities of images shot by adjacent shooting lenses are different; the image synthesis weight determining module 42 is used for determining corresponding image synthesis weights of image pixel blocks according to pixel color gray scale variations, pixel color gray scale differences and pixel color gray scale offsets of the image pixel blocks of each shot image; the image synthesizing module 43 is used for synthesizing all the shot images based on the image synthesis weights of the image pixel blocks of each shot image to form a high dynamic range panoramic shot image; the brightness continuity processing module 44 is used for conducting brightness continuity processing on the high dynamic range panoramic shot image to obtain a processed high dynamic range panoramic shot image; and the image splicing module 45 is used for splicing all the processed high dynamic range panoramic shot images to form a high dynamic range panoramic video.

When the high dynamic range video shooting device 40 of the present embodiment is used, first, the image acquiring module 41 acquires the corresponding shot images by means of the shooting lenses of the multi-lens panoramic camera, i.e., each shooting lens shots an image of its corresponding shooting range. Since images shot by adjacent shooting lenses have overlapping areas, and the exposure intensities of images shot by adjacent shooting lenses are different, each area of the finally synthesized panoramic shot image can be synthesized by the shot images with different exposure intensities, thus obtaining a panoramic shot image with a high dynamic range.

Then, the image synthesis weight determining module 42 acquires the pixel color gray scale variations, the pixel color gray scale differences, and the pixel color gray scale offsets of the image pixel blocks of each shot image.

Then, the image synthesis weight determining module 42 determines the corresponding image synthesis weights of the image pixel blocks according to the pixel color gray scale variations, the pixel color gray scale differences and the pixel color gray scale offsets of the image pixel blocks of the shot image. The image synthesis weights herein are the synthesis weight ratios of the image pixel blocks of the shot image when the image pixel blocks are synthesized into the high dynamic range panoramic shot image. Specifically, the image synthesis weight of each image pixel block can be calculated by the following formula:

$$w = a*L1 + b*L2 - c*L3;$$

wherein w is the image synthesis weight of the image pixel block, L1 is the pixel color gray scale variation of the image pixel block, L2 is the pixel color gray scale difference of the image pixel block, L3 is the image color gray scale offset, a is a pixel color gray scale variation weight coefficient, b is a pixel color gray scale difference weight coefficient, and c is an image color gray scale offset weight coefficient.

That is, the larger the pixel color gray scale variation is, the larger the image synthesis weight of the image pixel block is; the larger the pixel color gray scale difference is, the greater the image synthesis weight of the image pixel block is; and the smaller the image color gray scale offset is, the greater the image synthesis weight of the image pixel block is.

Then, the image synthesis weight determining module 42 normalizes the acquired image synthesis weights to facilitate the subsequent synthesis of the high dynamic range panoramic shot image.

Then, the image synthesizing module 43 synthesizes all the shot images based on the image synthesis weights of the image pixel blocks of each shot image obtained by the image synthesis weight determining module to form the high dynamic range panoramic shot image.

Since each image pixel block of each shot image has an image synthesis weight, and each image pixel block in the synthesized high dynamic range panoramic shot image is composed of at least one image pixel block of the shot images, the pixel color gray scale value of each image pixel block in the high dynamic range panoramic shot image can be formed by superposing a plurality of image pixel blocks. Specifically, the pixel color gray scale value of each image pixel block of the high dynamic range panoramic shot image can be calculated by the following formula:

$$v_k(T) = \sum_n^N w_k^p v_k(I_n);$$

wherein N is the number of the shooting lenses, I represents the image pixel blocks in the shot image, T represents the image pixel blocks in the high dynamic range panoramic shot image, $k_k(I_n)$ is the pixel color gray scale value of the k<th> image pixel block of the n<th> shooting lens, and $v_k(T)$ is the pixel color gray scale value of the k<th> image pixel block of the high dynamic range panoramic shot image.

Since each image pixel block of the high dynamic range panoramic shot image is synthesized by the image pixel blocks in different shot images, brightness jump of adjacent image pixel blocks may occur in the generated high dynamic range panoramic shot image. Therefore, the brightness continuity processing module 44 needs to perform brightness continuity processing on the high dynamic range panoramic shot image acquired by the image synthesizing module to obtain the processed high dynamic range panoramic shot image. Specifically, brightness continuity processing can be carried out on the high dynamic range panoramic shot image by the following formula:

$$O = \mathrm{argmin}_{O, \{w_k^n\}} \sum_n^N \Box v_k(O) - v_k(T) \Box_F^2 + \sum_n^N \Delta\Box(v_k(O) - v_k(I_n))\Box_F^2;$$

wherein N is the number of the shooting lenses, I represents the image pixel blocks in the shot image, T represents the image pixel blocks in the high dynamic range panoramic shot image, O represents the image pixel blocks in the high dynamic range panoramic shot image after brightness continuity processing, $w_k^n$ is an image synthesis weight of a k<th> image pixel block of an n<th> shooting lens, $v_k(I_n)$ is a pixel color gray scale value of the k<th> image pixel block of the n<th> shooting lens, $v_k(T)$ is a pixel color gray scale value of a k<th> image pixel block of the high dynamic range panoramic shot image, and $v_k(O)$ is a pixel color gray scale value of a k<th> image pixel block of the high dynamic range panoramic shot image after brightness continuity processing.

The brightness difference of the final high dynamic range panoramic shot image after brightness continuity processing output by the brightness continuity processing module 44 is continuous in the overlapping areas of various shot images, thus avoiding the problem of brightness jump of adjacent image pixel blocks.

Finally, the image splicing module 45 splices all the obtained high dynamic range panoramic shot images after brightness continuity processing in chronological order to finally form the high dynamic range panoramic video.

Then the high dynamic video shooting process of the high dynamic video shooting device 40 of the present embodiment is completed.

On the basis of the first embodiment, the high dynamic range video shooting device of the present embodiment further performs brightness continuity processing on the high dynamic range panoramic shot image, thereby further improving the stability of the obtained high dynamic range panoramic shot image and further improving the display effect of the corresponding high dynamic range panoramic video.

Figure 5A:
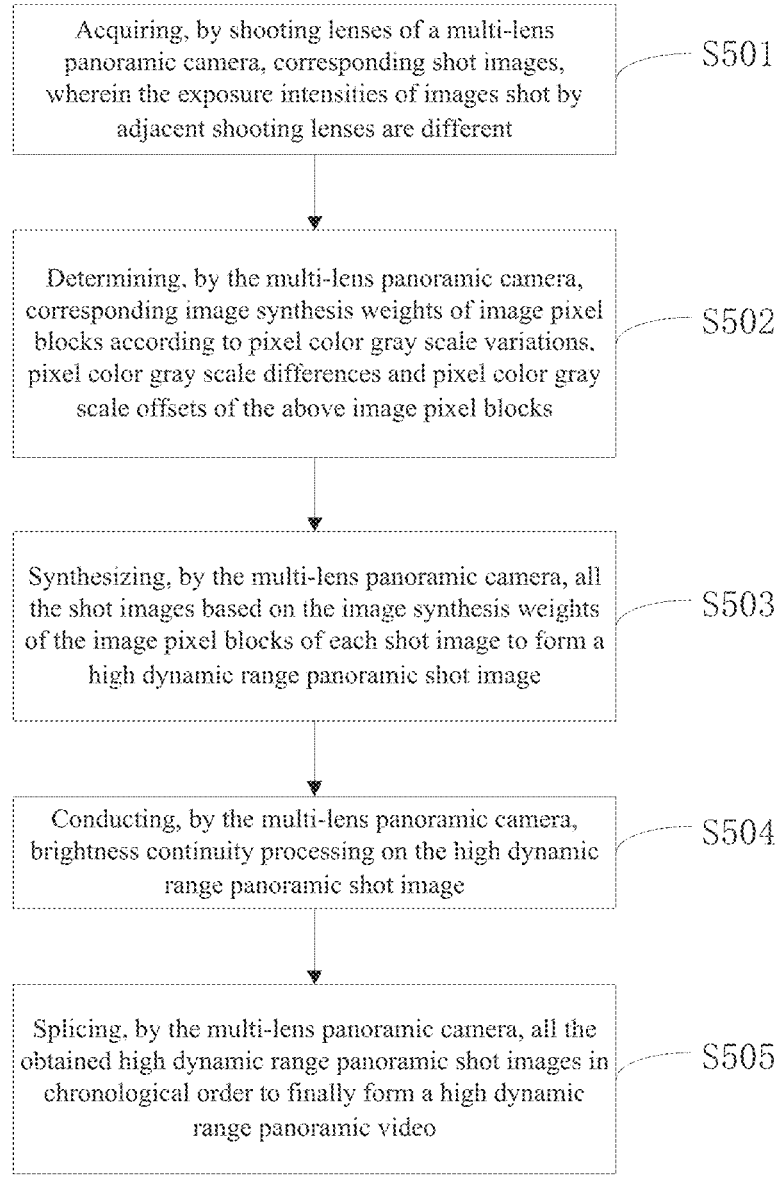
FIG. 5A is a video shooting flowchart of a specific embodiment of a high dynamic range video shooting method and a high dynamic range video shooting device of the present invention.
Figure 5B:
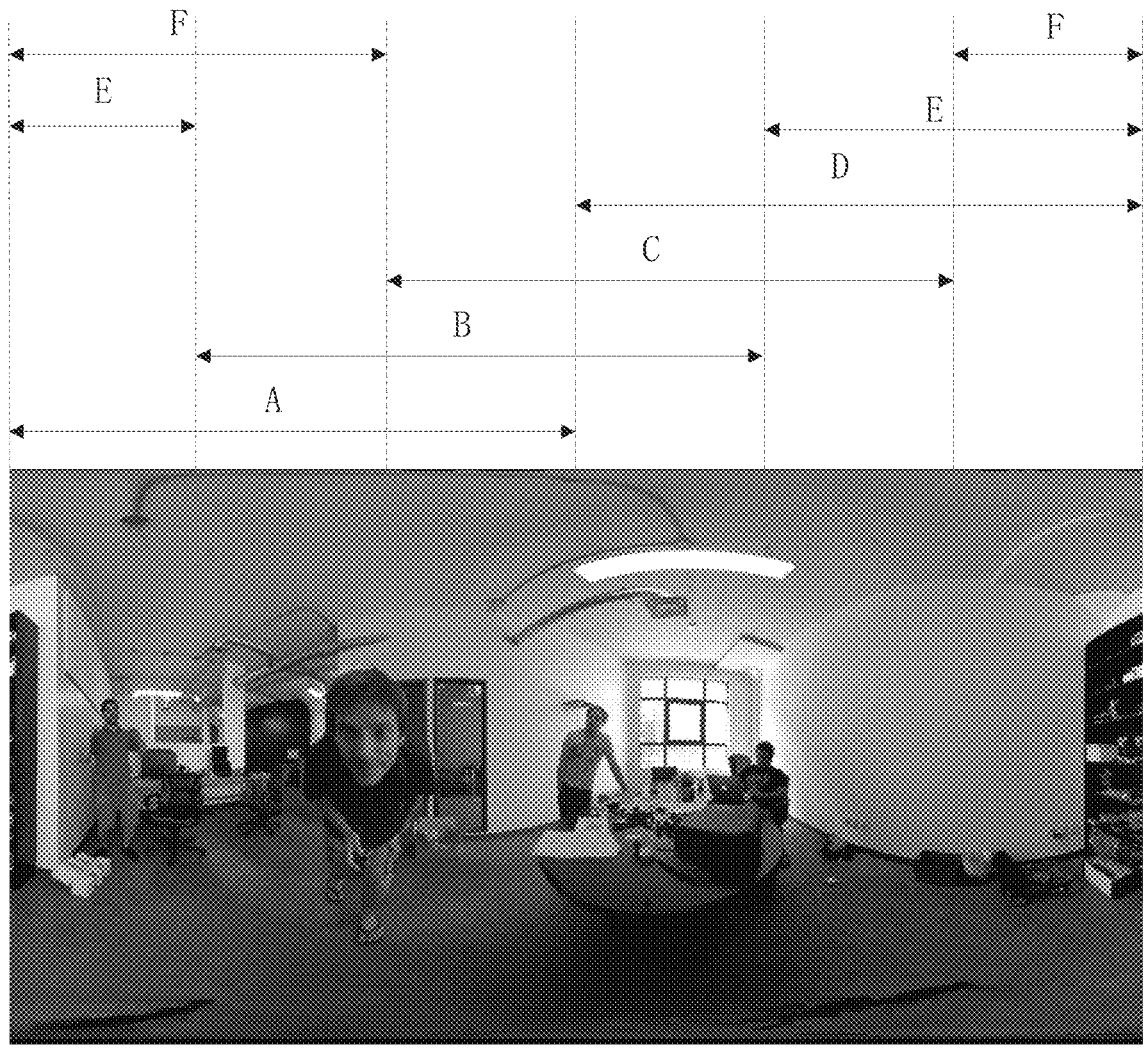
FIG. 5B is a schematic diagram of a high dynamic range panoramic video of a specific embodiment of a high dynamic range video shooting method and a high dynamic range video shooting device of the present invention.

The working principle of the high dynamic range video shooting method and the high dynamic range video shooting device of the present invention will be explained by a specific embodiment below. Please refer to FIG. 5A and FIG. 5B. FIG. 5A is a video shooting flowchart of a specific embodiment of the high dynamic range video shooting method and the high dynamic range video shooting device of the present invention; and FIG. 5B is a schematic diagram of a high dynamic range panoramic video of a specific embodiment of the high dynamic range video shooting method and the high dynamic range video shooting device of the present invention.

Figure 6A:
FIG. 6A is an image with high exposure intensity shot by a shooting lens B.
Figure 6B:
FIG. 6B is an image with low exposure intensity shot by a shooting lens C.

The high dynamic range video shooting device of this specific embodiment is arranged in a multi-lens panoramic camera. The multi-lens panoramic camera is provided with a shooting lens A, a shooting lens B, a shooting lens C, a shooting lens D, a shooting lens E, and a shooting lens F, and each shooting lens can cover a shooting range of 180 degrees. For details, please refer to the shooting range in FIG. 5B. The process of shooting a high dynamic video by the high dynamic range video shooting device of the present invention comprises:

S501: acquiring, by the shooting lenses of the multi-lens panoramic camera, corresponding shot images; wherein the exposure intensities of images shot by adjacent shooting lenses are different, for example, the shooting lens A, the shooting lens C and the shooting lens E shoot images with low exposure intensity; and the shooting lens B, the shooting lens D, and the shooting lens F shoot images with high exposure intensity. Referring specifically to FIGS. 6A and 6B, FIG. 6A is an image with high exposure intensity shot by the shooting lens B, and FIG. 6B is an image with low exposure intensity shot by the shooting lens C. In FIG. 6A, the content of area A in the image is missing due to the high exposure intensity, but in FIG. 6B, the content of area A can be displayed normally due to the low exposure intensity. In FIG. 6B, the content of area B in the image is missing due to the low exposure intensity, but in FIG. 6A, the content of area B can be displayed normally due to the high exposure intensity.

S502, acquiring, by the multi-lens panoramic camera, pixel color gray scale variations, pixel color gray scale differences and pixel color gray scale offsets of image pixel blocks of each shot image, so as to find abnormally displayed image pixel blocks and normally displayed image pixel blocks of the shot image.

Then, the multi-lens panoramic camera determines corresponding image synthesis weights of the image pixel blocks according to the pixel color gray scale variations, the pixel color gray scale differences and the pixel color gray scale offsets of the image pixel blocks. For area A in FIG. 6A, the corresponding image synthesis weights of the image pixel blocks are low because the pixel color gray scale offsets are large, the pixel color gray scale variations are small, and the pixel color gray scale differences are small, while for area B in FIG. 6A, the corresponding image synthesis weights of the image pixel blocks are high because the pixel color gray scale offsets are small and the pixel color gray scale differences are large. Similarly, the image synthesis weights of the image pixel blocks in area B of FIG. 6B are low, and the image synthesis weights of the image pixel blocks in area A of FIG. 6B are high. The image synthesis weights can be normalized herein.

S503, synthesizing, by the multi-lens panoramic camera, all the shot images according to the image synthesis weights of the image pixel blocks of the shot images acquired in S502 to form a high dynamic range panoramic shot image. Specifically, the pixel color gray scale value of each image pixel block of the high dynamic range panoramic shot image can be calculated by the following formula:

$$v_k(T) = \sum_n^N w_k^n v_k(I_n);$$

wherein the number of the shooting lenses is 6, I represents the image pixel blocks in the shot image, T represents the image pixel blocks in the high dynamic range panoramic shot image, $v_k(I_n)$ is the pixel color gray scale value of the k<th> image pixel block of the n<th> shooting lens, and $v_k(T)$ is the pixel color gray scale value of the k<th> image pixel block of the high dynamic range panoramic shot image.

S504, conducting, by the multi-lens panoramic camera, brightness continuity processing on the high dynamic range panoramic shot image by the following formula:

$$O = \mathrm{argmin}_{O,\{w_k^n\}} \sum_n^N \Box v_k(O) - v_k(T) \Box_F^2 + \sum_n^N \Delta\Box(v_k(O) - v_k(I_n))\Box_F^2;$$

wherein N is the number of the shooting lenses, I represents the image pixel blocks in the shot image, T represents the image pixel blocks in the high dynamic range panoramic shot image, O represents the image pixel blocks in the high dynamic range panoramic shot image after brightness continuity processing, $w_k^n$ is an image synthesis weight of a k<th> image pixel block of an n<th> shooting lens, $v_k(I_n)$ is a pixel color gray scale value of the k<th> image pixel block of the n<th> shooting lens, $v_k(T)$ is a pixel color gray scale value of a k<th> image pixel block of the high dynamic range panoramic shot image, and $v_k(O)$ is a pixel color gray scale value of a k<th> image pixel block of the high dynamic range panoramic shot image after brightness continuity processing.

In this way, the high dynamic range panoramic shot image after brightness continuity processing is finally output. The brightness difference of the high dynamic range panoramic shot image is continuous in the overlapping areas of various shot images, thus avoiding the problem of brightness jump of adjacent image pixel blocks.

S505, splicing, by the multi-lens panoramic camera, all the obtained high dynamic range panoramic shot images in chronological order to finally form the high dynamic range panoramic video, as shown in FIG. 5B.

Then the high dynamic video shooting process of the high dynamic range video shooting method and the high dynamic range video shooting device of the specific embodiment is completed.

In the high dynamic range video shooting method and device of the present invention, different exposure intensities are adopted for the images shot by adjacent shooting lenses of the multi-lens panoramic camera, so that the high dynamic range panoramic shot images can be synthesized from multiple shot images with different exposure intensities, and further the high dynamic range panoramic video is formed. Since each frame of the video corresponds to at least one high dynamic range panoramic shot image, HDR videos of fast moving objects can be shot. The technical problem that positions of high-speed moving objects in an HDR video synthesized by an existing high dynamic range video shooting method and device are inaccurate is solved.

As used herein, the terms "component," "module," "system", "interface", "process" and the like are generally intended to refer to a computer-related entity: hardware, a combination of hardware and software, software, or software in execution. For example, a component may be, but is not limited to, a process running on a processor, a processor, an object, an executable application, a thread of execution, a program, and/or a computer. By means of illustration, both an application running on a controller and the controller can be components. One or more components may exist within processes and/or threads of execution, and the components may be located on one computer and/or distributed between two or more computers.

Various operations of the embodiments are provided herein. In one embodiment, the one or more operations may constitute computer readable instructions stored on one or more computer readable media that, when executed by an electronic device, will cause the computing device to perform the operations. The order in which some or all of the operations are described should not be interpreted as implying that these operations must be order dependent. Those skilled in the art will understand alternative ordering having the benefit of this specification. Moreover, it should be understood that not all operations are necessarily present in each of the embodiments provided herein.

Moreover, the word "preferred" as used herein is intended to be used as an instance, example, or illustration. Any aspect or design described herein as "preferred" is not necessarily to be construed as more advantageous than other aspects or designs. On the contrary, the use of the word "preferred" is intended to present the concept in a specific way. The term "or" as used in the present application is intended to mean inclusive "or" rather than exclusive "or". That is, unless otherwise specified or clear from the context, "X uses A or B" means naturally including any one that is listed. That is, if X uses A; X uses B; or X uses both A and B, then "X uses A or B" is satisfied in any of the preceding examples.

Moreover, although the present disclosure has been shown and described with respect to one or more implementations, equivalent variations and modifications will occur to those skilled in the art upon reading and understanding the specification and drawings. The present disclosure includes all such modifications and variations and is limited only by the scope of the appended claims. In particular, with respect to various functions performed by the above-mentioned components (elements, resources, etc.), the terms used to describe such components are intended to correspond to any component (unless otherwise indicated) that performs the specified function (e.g., it is functionally equivalent) of the component, even though structurally different from the disclosed structure that performs the function in the exemplary implementation of the present disclosure shown herein. Furthermore, although a particular feature of the present disclosure has been disclosed with respect to only one of several implementations, such feature may be combined with one or more other features of other implementations as may be desirable and advantageous for a given or particular application. Furthermore, to the extent that the terms "comprise", "have", "contain" or variations thereof are used in specific embodiments or claims, such terms are intended to comprise in a manner similar to the term "include".

Functional units in the embodiments of the present invention can be integrated into one processing module, or physically exist separately, or two or more units can be integrated into one module. The above integrated module can be implemented in the form of hardware or a software functional module. If the integrated module is implemented in the form of a software functional module and sold or used as an independent product, it may also be stored in a computer readable storage medium. The storage medium mentioned above may be a read-only memory, a magnetic disk or an optical disk, etc. Each device or system described above can execute the method in the corresponding method embodiment.

In summary, although the present invention has been disclosed in terms of preferred embodiments, the above preferred embodiments are not intended to limit the present invention. Those skilled in the art can make various changes and modifications without departing from the spirit and scope of the present invention. Therefore, the scope of protection of the present invention shall be as defined in the claims.

What is claimed is:

1. A high dynamic range video shooting method, used for shooting high dynamic range videos by a multi-lens panoramic camera, the multi-lens panoramic camera being provided with a plurality of shooting lenses with different shooting directions, and images shot by adjacent shooting lenses having overlapping areas, wherein the high dynamic range video shooting method comprises:
acquiring corresponding shot images by the shooting lenses of the multi-lens panoramic camera, wherein the exposure intensities of images shot by adjacent shooting lenses are different;
determining corresponding image synthesis weights of image pixel blocks according to pixel color gray scale variations, pixel color gray scale differences and pixel color gray scale offsets of the image pixel blocks of each shot image;
synthesizing all the shot images based on the image synthesis weights of the image pixel blocks of each shot image to form a high dynamic range panoramic shot image;
conducting brightness continuity processing on the high dynamic range panoramic shot image to obtain a processed high dynamic range panoramic shot image; and
splicing all the processed high dynamic range panoramic shot images to form a high dynamic range panoramic video;
wherein the step of determining corresponding image synthesis weights of image pixel blocks according to pixel color gray scale variations, pixel color gray scale differences and pixel color gray scale offsets of the image pixel blocks of each shot image comprises:

$$w = a*L1 + b*L2 - c*L3;$$

wherein w is the image synthesis weight of the image pixel block, L1 is the pixel color gray scale variation of the image pixel block, L2 is the pixel color gray scale difference of the image pixel block, L3 is the image color gray scale offset, a is a pixel color gray scale variation weight coefficient, b is a pixel color gray scale difference weight coefficient, and c is an image color gray scale offset weight coefficient;
wherein the step of conducting brightness continuity processing on the high dynamic range panoramic shot image comprises:

$$v_k(T) = \sum_n^N w_k^n v_k(I_n);$$

$$O = \mathrm{argmin}_{O, \{w_k^n\}} \sum_n^N \Box v_k(O) - v_k(T) \Box_F^2 + \sum_n^N \Delta \Box (v_k(O) - v_k(I_n)) \Box_F^2;$$

wherein N is the number of the shooting lenses, I represents the image pixel blocks in the shot image, T represents the image pixel blocks in the high dynamic range panoramic shot image, O represents the image pixel blocks in the high dynamic range panoramic shot image after brightness continuity processing, $w_k^n$ is an image synthesis weight of a k<th>image pixel block of an n<th>shooting lens, $v_k(I_n)$ is a pixel color gray scale value of the k<th>image pixel block of the n<th>shooting lens, $v_k(T)$ is a pixel color gray scale value of a k<th>image pixel block of the high dynamic range panoramic shot image, and $v_k(O)$ is a pixel color gray scale value of a k<th>image pixel block of the high dynamic range panoramic shot image after brightness continuity processing.

2. The high dynamic range video shooting method according to claim 1, wherein the exposure intensities include high exposure intensity and low exposure intensity, when one shooting lens is of high exposure intensity, the adjacent shooting lenses are of low exposure intensity, and when one shooting lens is of low exposure intensity, the adjacent shooting lenses are of high exposure intensity.

3. The high dynamic range video shooting method according to claim 1, wherein the step of determining corresponding image synthesis weights of image pixel blocks according to pixel color gray scale variations, pixel color gray scale differences and pixel color gray scale offsets of the image pixel blocks of each shot image further comprises:
normalizing the image synthesis weights.

4. A high dynamic range video shooting method, used for shooting high dynamic range videos by a multi-lens panoramic camera, the multi-lens panoramic camera being provided with a plurality of shooting lenses with different shooting directions, and images shot by adjacent shooting lenses having overlapping areas, wherein the high dynamic range video shooting method comprises:
acquiring corresponding shot images by the shooting lenses of the multi-lens panoramic camera, wherein the exposure intensities of images shot by adjacent shooting lenses are different;
determining corresponding image synthesis weights of image pixel blocks according to pixel color gray scale variations, pixel color gray scale differences and pixel color gray scale offsets of the image pixel blocks of each shot image;
synthesizing all the shot images based on the image synthesis weights of the image pixel blocks of each shot image to foiiii a high dynamic range panoramic shot image; and
splicing all the high dynamic range panoramic shot images to form a high dynamic range panoramic video,
wherein the step of determining corresponding image synthesis weights of image pixel blocks according to pixel color gray scale variations, pixel color gray scale differences and pixel color gray scale offsets of the image pixel blocks of each shot image comprises:

$$w = a*L1 + b*L2 - c*L3;$$

wherein w is the image synthesis weight of the image pixel block, L1 is the pixel color gray scale variation of the image pixel block, L2 is the pixel color gray scale difference of the image pixel block, L3 is the image color gray scale offset, a is a pixel color gray scale variation weight coefficient, b is a pixel color gray scale difference weight coefficient, and c is an image color gray scale offset weight coefficient.

5. The high dynamic range video shooting method according to claim 4, wherein the exposure intensities include high exposure intensity and low exposure intensity, when one shooting lens is of high exposure intensity, the adjacent shooting lenses are of low exposure intensity, and when one shooting lens is of low exposure intensity, the adjacent shooting lenses are of high exposure intensity.

6. The high dynamic range video shooting method according to claim 4, wherein after the step of forming the high dynamic range panoramic shot image, the method further comprises:
conducting brightness continuity processing on the high dynamic range panoramic shot image to obtain a processed high dynamic range panoramic shot image;
and the step of splicing all the high dynamic range panoramic shot images to form the high dynamic range panoramic video comprises:
splicing all the processed high dynamic range panoramic shot images to form a high dynamic range panoramic video.

7. The high dynamic range video shooting method according to claim 6, wherein the step of conducting brightness continuity processing on the high dynamic range panoramic shot image comprises:

$$v_k(T) = \sum_n^N w_k^n v_k(I_n);$$

$$O = \mathrm{argmin}_{O,\{w_k^n\}} \sum_n^N \Box v_k(O) - v_k(T) \Box_F^2 + \sum_n^N \Delta \Box (v_k(O) - v_k(I_n)) \Box_F^2;$$

wherein N is the number of the shooting lenses, I represents the image pixel blocks in the shot image, T represents the image pixel blocks in the high dynamic range panoramic shot image, O represents the image pixel blocks in the high dynamic range panoramic shot image after brightness continuity processing, $w_k^n$ is an image synthesis weight of a k<th>image pixel block of an n<th>shooting lens, $v_k(I_n)$ is a pixel color gray scale value of the k<th>image pixel block of the n<th>shooting lens, $v_k(T)$ is a pixel color gray scale value of a k<th>image pixel block of the high dynamic range panoramic shot image, and $v_k(O)$ is a pixel color gray scale value of a k<th>image pixel block of the high dynamic range panoramic shot image after brightness continuity processing.

8. The high dynamic range video shooting method according to claim 4, wherein the step of determining corresponding image synthesis weights of image pixel blocks according to pixel color gray scale variations, pixel color gray scale differences and pixel color gray scale offsets of the image pixel blocks of each shot image further comprises:
normalizing the image synthesis weights.

9. A high dynamic range video shooting device, arranged in a multi-lens panoramic camera and used for shooting high dynamic range videos by the multi-lens panoramic camera, the multi-lens panoramic camera being provided with a plurality of shooting lenses with different shooting directions, and images shot by adjacent shooting lenses having overlapping areas, wherein the high dynamic range video shooting device comprises:
a shot image acquiring module for acquiring corresponding shot images by means of the shooting lenses of the multi-lens panoramic camera, wherein the exposure intensities of images shot by adjacent shooting lenses are different;
an image synthesis weight determining module for determining corresponding image synthesis weights of image pixel blocks according to pixel color gray scale variations, pixel color gray scale differences and pixel color gray scale offsets of the image pixel blocks of each shot image;
an image synthesizing module for synthesizing all the shot images based on the image synthesis weights of the image pixel blocks of each shot image to form a high dynamic range panoramic shot image; and
an image splicing module for splicing all the high dynamic range panoramic shot images to form a high dynamic range panoramic video,
wherein the image synthesis weight determining module obtains the image synthesis weight according to the following foiniula:

$$w = a*L1 + b*L2 - c*L3;$$

wherein w is the image synthesis weight of the image pixel block, L1 is the pixel color gray scale variation of the image pixel block, L2 is the pixel color gray scale difference of the image pixel block, L3 is the image color gray scale offset, a is a pixel color gray scale variation weight coefficient, b is a pixel color gray scale difference weight coefficient, and c is an image color gray scale offset weight coefficient.

10. The high dynamic range video shooting device according to claim 9, wherein the exposure intensities include high exposure intensity and low exposure intensity, when one shooting lens is of high exposure intensity, the adjacent shooting lenses are of low exposure intensity, and when one shooting lens is of low exposure intensity, the adjacent shooting lenses are of high exposure intensity.

11. The high dynamic range video shooting device according to claim 9, wherein the high dynamic range video shooting device further comprises:
a brightness continuity processing module for conducting brightness continuity processing on the high dynamic range panoramic shot image to obtain a processed high dynamic range panoramic shot image;
and the image splicing module is used for splicing all the processed high dynamic range panoramic shot images to form a high dynamic range panoramic video.

12. The high dynamic range video shooting device according to claim 11, wherein the brightness continuity processing module performs brightness continuity processing on the high dynamic range panoramic shot image according to the following formula:

$$v_k(T) = \sum_n^N w_k^n v_k(I_n);$$

$$O = \mathrm{argmin}_{O,\{w_k^n\}} \sum_n^N \Box v_k(O) - v_k(T) \Box_F^2 + \sum_n^N \Delta \Box (v_k(O) - v_k(I_n)) \Box_F^2;$$

wherein N is the number of the shooting lenses, I represents the image pixel blocks in the shot image, T represents the image pixel blocks in the high dynamic range panoramic shot image, O represents the image pixel blocks in the high dynamic range panoramic shot image after brightness continuity processing, $w_k^n$ is an image synthesis weight of a k<th>image pixel block of an n<th>shooting lens, $v_k(I_n)$ is a pixel color gray scale value of the k<th>image pixel block of the n<th>shooting lens, $v_k(T)$ is a pixel color gray scale value of a k<th>image pixel block of the high dynamic range panoramic shot image, and $v_k(O)$ is a pixel color gray scale value of a k<th>image pixel block of the high dynamic range panoramic shot image after brightness continuity processing.

\* \* \* \* \*